UNITED STATES PATENT OFFICE.

RUDOLF GOTTLIEB, OF HEIDELBERG, GERMANY, ASSIGNOR TO KNOLL & CO., OF LUDWIGSHAFEN, GERMANY.

ALBUMEN-TANNIN AND PROCESS OF MAKING IT.

SPECIFICATION forming part of Letters Patent No. 563,479, dated July 7, 1896.

Application filed February 27, 1896. Serial No. 581,045. (Specimens.)

*To all whom it may concern:*

Be it known that I, RUDOLF GOTTLIEB, of Heidelberg, in the Grand Duchy of Baden, German Empire, have invented a new Albumen-Tannin Compound and Processes for Obtaining the Same, of which the following is a specification.

In employing tannic acid as an astringent it is highly desirable to have it in a form insoluble or unattackable by stomach digestion, so that the tannic acid would work in the bowels or intestines only and not previously in the stomach. In taking tannic acid for astringent action on the mucous membrane of the intestines or bowels, the stomach is affected, which is not at all desirable because, in taking the astringent for a period of time, inconveniences from indigestion may arise, and, on the other hand, in consequence of the absorption of the easily-soluble tannic acid in the stomach, parts only of the astringent will arrive at its place of destination. A compound of tannic acid, therefore, insoluble in the stomach, will have no effect in the stomach and will escape absorption therein to be afterward dissolved and come into effect in the intestines or bowels only.

I have succeeded, by a process hitherto unknown, in rendering the albumen compound of tannic acid indifferent to or unaffected by stomach digestion.

While the albuminate of tannin if employed in a freshly-precipitated state will be digested in an effective gastric juice within a few minutes, and while the powder of such compound if air-dried will be completely dissolved within in about two hours, the same quantity of the preparation if heated for six to ten hours up to 110° centigrade and above will hardly be attacked by the gastric juice even within twenty-four hours. This last-mentioned tannic-acid compound, which is the subject of my invention, resisting the stomach digestion, is highly appropriate for operation in the bowels or intestines, as the entire tannin, taken in this form, will work within the bowels and intestines, and even if used for a prolonged period will not affect the mucous membrane of the stomach. The said compound is an amorphous yellowish-gray powder insoluble in water, alcohol, ether, and diluted acids, soluble in the alkaline carbonates and caustic alkalies. The solution of the compound in caustic alkalies is brown-red and is precipitated by the addition of acids.

For manufacturing the above-characterized albumen-tannin compound or albuminate of tannin I proceed with the precipitate obtained by well-known methods which results if aqueous solutions of tannic acid and albumen are mixed.

I have found the following method of manufacturing the albuminate of tannin to answer the purpose well: Ten kilograms of albumen and twenty kilograms of tannic acid are dissolved separately in cold distilled water, and afterward the solutions are slowly mixed while permanently stirred. The mixture being allowed to settle, the floating solution is decanted and the precipitate is then freed by repeated lixiviation from any surplus of tannic acid and is afterward filtered, pressed off, and dried, and is finally heated during a period of six to ten hours at a temperature of 110° centigrade or above this temperature.

The weight of the albumen-tannin compound thus obtained will be about ten kilograms. The heating may be effected in the usual manner within an air-bath, with or without the aid of a vacuum or it may be effected so that the moist precipitate or the precipitate dried in moderate heat is heated in any indifferent liquids, such, for instance, as toluene or xylene for several hours, as much as possible of the fluid being afterward poured off from the precipitate and the remainder being removed by evaporation.

The dose to be taken daily is two to three grams.

What I claim as my invention is—

1. The albumen-tannin compound herein described, having the quality of resisting the action of the juices of the stomach but being readily active upon the mucous membrane of the bowels or intestines, its form being that of an amorphous yellowish-gray powder insoluble in water, alcohol, ether and diluted acids but soluble in the alkaline carbonates and caustic alkalies, and its solution in caustic alkali being of a brown-red color and precipitating by the addition of acids.

2. The within-described process of obtaining an albumen-tannin compound or albuminate of tannin insoluble in the stomach but effective in the bowels or intestines, said process consisting in heating the known precipitate obtained by mixing aqueous solutions of albumen and tannin to a temperature of 110° to 150° centigrade.

In testimony that I claim the foregoing as my invention I have signed my name in presence of two subscribing witnesses.

RUDOLF GOTTLIEB.

Witnesses:
　HANS KNOLL,
　OSWALD KRUG.